US012257646B2

(12) United States Patent
Park et al.

(10) Patent No.: US 12,257,646 B2
(45) Date of Patent: Mar. 25, 2025

(54) HORN AND WELDING DEVICE (71) Applicant: LG Energy Solution, Ltd., Seoul (KR)

(72) Inventors: Jung Su Park, Daejeon (KR); Chang Bum Ahn, Daejeon (KR); Il Hwan Park, Daejon (KR)

(73) Assignee: LG Energy Solution, Ltd., Seoul (KR)

( * ) Notice: Subject to any disclaimer, the term of this patent is extended or adjusted under 35 U.S.C. 154(b) by 923 days.

(21) Appl. No.: 17/423,293

(22) PCT Filed: Oct. 1, 2019

(86) PCT No.: PCT/KR2019/012818
§ 371 (c)(1),
(2) Date: Jul. 15, 2021

(87) PCT Pub. No.: WO2020/153570
PCT Pub. Date: Jul. 30, 2020

(65) Prior Publication Data
US 2022/0088708 A1 Mar. 24, 2022

(30) Foreign Application Priority Data

Jan. 21, 2019 (KR) ........................ 10-2019-0007599

(51) Int. Cl.
*B23K 26/21* (2014.01)
*B23K 20/00* (2006.01)
(Continued)

(52) U.S. Cl.
CPC ............ *B23K 26/21* (2015.10); *B23K 20/002* (2013.01); *B23K 20/106* (2013.01);
(Continued)

(58) Field of Classification Search
CPC .... B23K 26/21; B23K 20/002; B23K 20/106; B23K 2101/38; B23K 26/346;
(Continued)

(56) References Cited

U.S. PATENT DOCUMENTS

2006/0169388 A1 8/2006 Shimizu et al.
2012/0308855 A1* 12/2012 Shimizu ............. H01M 50/533
29/623.2
(Continued)

FOREIGN PATENT DOCUMENTS

CN 103503196 A 1/2014
CN 109014554 A * 12/2018 ............. B23K 20/10
(Continued)

OTHER PUBLICATIONS

International Search Report for PCT/KR2019/012818 dated Jan. 14, 2020; 2 pgs.
(Continued)

*Primary Examiner* — Brian W Jennison
(74) *Attorney, Agent, or Firm* — Lerner David LLP (57) ABSTRACT

A horn includes a plurality of protrusion formation parts, each of which has a plurality of protrusions that protrude from a welding surface and are arranged in a line in at least one row, the plurality of protrusion formation parts respectively configured to form pattern formation parts on an outermost electrode tab of electrode tabs of a secondary battery, and a protrusion-free part which is disposed between two protrusion formation parts of the plurality of protrusion formation parts and in which protrusions are not provided to expose the welding surface to an outside, the protrusion-free part configured to form a pattern-free part on the outermost electrode tab. The protrusion-free part has a width greater than a width of each of the protrusions.

15 Claims, 9 Drawing Sheets (51) Int. Cl.
    *B23K 20/10*     (2006.01)
    *B23K 101/38*     (2006.01)
    *H01M 50/533*     (2021.01)
    *H01M 50/536*     (2021.01)

(52) U.S. Cl.
    CPC ....... *H01M 50/533* (2021.01); *H01M 50/536* (2021.01); *B23K 2101/38* (2018.08)

(58) Field of Classification Search
    CPC .. B23K 28/02; H01M 50/533; H01M 50/536; H01M 50/538; H01M 50/54; Y02E 60/10
    See application file for complete search history.

(56) References Cited

U.S. PATENT DOCUMENTS

| | | |
|---|---|---|
| 2013/0295444 A1 | 11/2013 | Kim et al. |
| 2014/0255768 A1* | 9/2014 | Jang .................... H01M 50/561 |
| | | 429/211 |
| 2016/0043360 A1 | 2/2016 | Byun et al. |
| 2019/0148706 A1 | 5/2019 | Ohnishi |

FOREIGN PATENT DOCUMENTS

| | | |
|---|---|---|
| CN | 109196684 A | 1/2019 |
| EP | 2985806 A1 | 2/2016 |
| JP | 4792945 B2 | 10/2011 |
| JP | 2014203780 A | 10/2014 |
| JP | 2014212012 A | 11/2014 |
| JP | 2015136731 A | 7/2015 |
| JP | 2016052670 A | 4/2016 |
| JP | 2017006940 A | 1/2017 |
| JP | 2018023997 A | 2/2018 |
| JP | 2018157082 A | 10/2018 |
| KR | 20120067291 A | 6/2012 |
| KR | 20140022690 A | 2/2014 |
| KR | 20140027775 A | 3/2014 |
| KR | 2014-0056912 A | 5/2014 |
| KR | 20140110353 A | 9/2014 |
| KR | 20150038930 A | 4/2015 |
| KR | 101522450 B1 | 5/2015 |
| WO | 2013105361 A1 | 7/2013 |

OTHER PUBLICATIONS

Extended European Search Report including Written Opinion for Application No. 19911594.0 dated Jan. 19, 2022; pp. 1-7.
Search Report dated Apr. 28, 2022 from the Office Action for Chinese Application No. 201980085502.X issued May 7. 2022, pp. 1-3.

* cited by examiner

PRIOR ART

FIG.1

PRIOR ART

HORN AND WELDING DEVICE

CROSS-REFERENCE TO RELATED APPLICATIONS

The present application is a national phase entry under 35 U.S.C. § 371 of International Application No. PCT/KR2019/012818, filed Oct. 1, 2019, published in Korean, which claims the benefit of the priority of Korean Patent Application No. 10-2019-0007599, filed on Jan. 21, 2019, both of which are hereby incorporated by reference in their entireties.

TECHNICAL FIELD

The present invention relates to a horn and a welding device, and more specifically, to a horn and a welding device which are capable of improving welding strength of laser welding performed after ultrasonic welding.

BACKGROUND ART

In general, as types of secondary batteries, there are nickel-cadmium batteries, nickel-hydrogen batteries, lithium ion batteries, and lithium ion polymer batteries. Such secondary batteries are being used for large products, requiring a high output, such as electric vehicles or hybrid electric vehicles, power storage devices for storing surplus generated power and renewable energy, and backup-power storage devices, as well as small products such as digital cameras, P-DVDs, MP3 Players, cellular phones, PDAs, portable game devices, power tools, and E-bikes.

In order to manufacture the secondary batteries, first of all, electrode active material slurry is applied to a positive electrode collector and a negative electrode collector to manufacture a positive electrode and a negative electrode, and the positive electrode and the negative electrode are stacked on both sides of a separator to form an electrode assembly having a predetermined shape. Subsequently, the electrode assembly is accommodated in a battery case, an electrolyte is injected into the battery case, and the battery case is sealed.

The electrode assembly includes electrode tabs. Each of the electrode tabs protrudes outward from the electrode assembly to serve as a path through which electrons may move between the inside and the outside of the electrode assembly. The electrode tab protrudes from each of the plurality of electrodes so as to be connected to each other outside the electrode assembly. Here, ultrasonic welding using a horn and anvil may be used when the plurality of electrode tabs are connected to each other. The electrode assembly also includes electrode leads. Each of the electrode leads is connected to the electrode tab to supply electricity, which is generated inside the electrode assembly, to the outside. Here, laser welding may be used to connect the electrode tab to the electrode lead.

Figure 1:
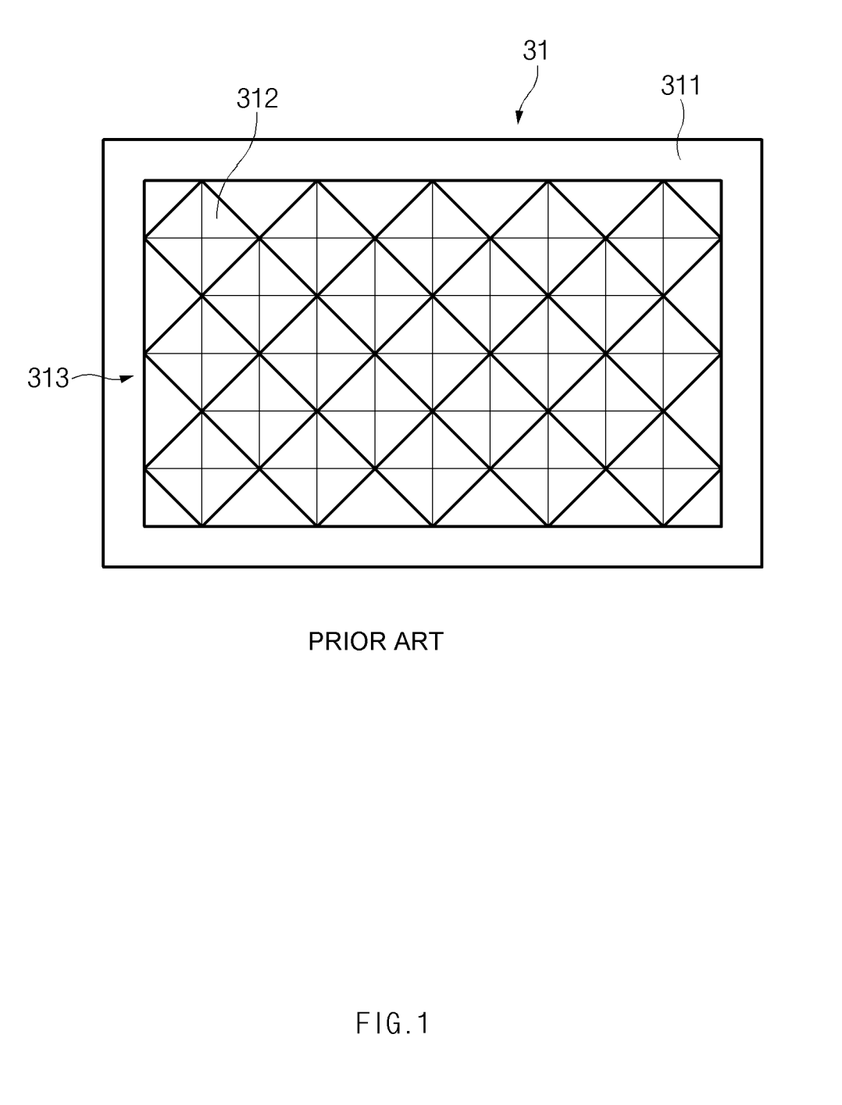
FIG. 1 is a schematic view illustrating a welding surface of a horn according to the related art.
Figure 2:
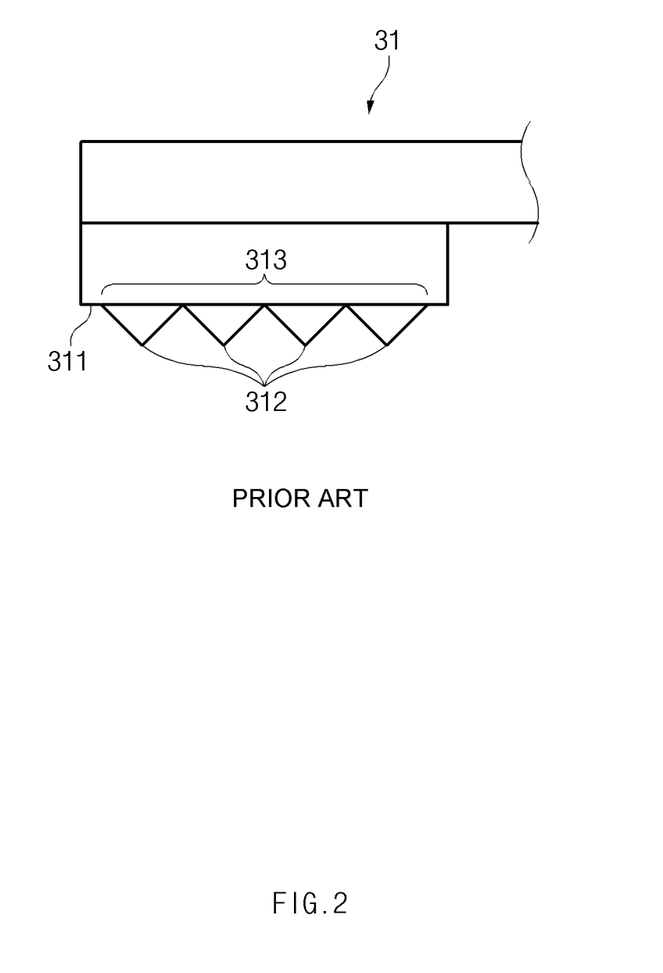
FIG. 2 is a side view of the horn according to the related art.

FIG. 1 is a schematic view illustrating a welding surface 311 of a horn 31 according to the related art, and FIG. 2 is a side view of the horn 31 according to the related art.

When a plurality of electrode tabs are ultrasonically welded to each other, first of all, the plurality of electrode tabs to be welded to each other are stacked seated on a welding surface (not shown) of an anvil, and then a pressure is applied to the electrode tabs on the welding surface 311 of the horn 31. Here, as illustrated in FIGS. 1 and 2, a protrusion formation part 313, on which a plurality of protrusions 312 sharply protruding are continuously arranged at a certain interval, is provided on the welding surface 311 of the horn 31. When the horn 31 applies a pressure to the plurality of electrode tabs, patterns that are recessed to correspond to shapes of the protrusions 312 are formed on a surface of the electrode tab. Then, ultrasonic waves are applied to weld the plurality of electrode tabs to each other.

Also, after the ultrasonic welding is completed, the electrode tab and the electrode lead overlap each other so as to perform laser welding. According to the related art, however, there is no gap or a very small gap between the plurality of protrusions 312. As a result, there is also no gap or a very small gap between the patterns. However, when laser beams are emitted after the electrode lead overlaps a pattern formation part on which the patterns are provided, energy of the laser beams disperses on a surface of the electrode tab due to the patterns. Therefore, there is a problem in which welding strength of the laser welding is deteriorated.

DISCLOSURE OF THE INVENTION

Technical Problem

An objective of the present invention is to provide a horn and a welding device which are capable of improving welding strength of laser welding performed after ultrasonic welding.

The objective of the present invention is not limited to the aforesaid, but other objectives not described herein will be clearly understood by those skilled in the art from descriptions below.

Technical Solution

A horn according to an embodiment of the present invention to solve the problems includes: a plurality of protrusion formation parts, each of which has a plurality of protrusions that protrude from a welding surface and are arranged in a line in at least one row, the plurality of protrusion formation parts respectively configured to form pattern formation parts on an outermost electrode tab of electrode tabs of a secondary battery; and a protrusion-free part which is disposed between two protrusion formation parts of the plurality of protrusion formation parts and in which protrusions are not provided to expose the welding surface to an outside, the protrusion-free part configured to form a pattern-free part on the outermost electrode tab, wherein the protrusion-free part has a width greater than a width of each of the protrusions.

Also, the width of the protrusion-free part may be less than two times the width of each of the protrusions.

In addition, the plurality of protrusion formation parts may include a first protrusion formation part and a second protrusion formation part, and in the first protrusion formation part, the plurality of protrusions may be arranged in lines in a plurality of rows.

Also, in the second protrusion formation part, the plurality of protrusions may be arranged parallel to the plurality of protrusions of the first protrusion formation part.

Also, the plurality of protrusion formation parts may further include a third protrusion formation part in which the plurality of protrusions are arranged parallel to the plurality of protrusions of the second protrusion formation part.

Also, the protrusion-free part may include: a first protrusion-free part disposed between the first protrusion formation part and the second protrusion formation part; and a second protrusion-free part disposed between the second protrusion formation part and the third protrusion formation part.

Also, each of the protrusions may have a shape of a truncated square pyramid.

Also, a side of a bottom surface of each of the protrusions may be parallel to a side of the welding surface.

Also, in each of the plurality of protrusions, a length of a side of a top surface of the protrusion may be half or more than a length of a side of the bottom surface of the protrusion.

Also, in each of the plurality of protrusions, the length of the side of the top surface of the protrusion may be ⅔ or more than the length of the side of the bottom surface of the protrusion.

A welding device according to an embodiment of the present invention to solve the problems includes: a horn including a plurality of protrusion formation parts, each of which has a plurality of protrusions that protrude from a welding surface and are arranged in a line in at least one row, the plurality of protrusion formation parts respectively configured to form pattern formation parts on an outermost electrode tab of electrode tabs of a secondary battery, and a protrusion-free part which is disposed between two protrusion formation parts of the plurality of protrusion formation parts and in which protrusions are not provided to expose the welding surface to an outside, the protrusion-free part configured to form a pattern-free part on the outermost electrode tab, wherein the protrusion-free part has a width greater than a width of each of the protrusions; an anvil facing the horn when the electrode tabs are disposed therebetween to weld the electrode tabs; and a laser generation part configured to generate laser beams to emit the laser beams onto the pattern-free part when the outermost electrode tab overlaps an electrode lead.

Also, the plurality of protrusion formation parts may include a first protrusion formation part and a second protrusion formation part, and in the first protrusion formation part, the plurality of protrusions may be arranged in lines in a plurality of rows, and in the second protrusion formation part, the plurality of protrusions may be arranged parallel to the plurality of protrusions of the first protrusion formation part.

Also, the plurality of protrusion formation parts may further include a third protrusion formation part in which the plurality of protrusions are arranged parallel to the plurality of protrusions of the second protrusion formation part.

Also, the protrusion-free part may include: a first protrusion-free part disposed between the first protrusion formation part and the second protrusion formation part; and a second protrusion-free part disposed between the second protrusion formation part and the third protrusion formation part.

Other specific features of the present invention are included in the detailed description and drawings.

Advantageous Effects

According to the embodiments of the present invention, at least the following effects may be obtained.

When the ultrasonic welding is performed in the state in which the protrusion-free part is provided between the plurality of protrusion parts of the horn, the plurality of pattern formation parts and the pattern-free part may be formed on the electrode tab. As the laser welding is performed through the pattern-free part, the energy of the laser beams may be prevented from dispersing to improve the welding strength of the laser welding.

The effects according to the present invention are not limited to the features exemplified above, and more various effects are included in the present specification.

MODE FOR CARRYING OUT THE INVENTION

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless otherwise defined, all terms (including technical and scientific terms) used herein have the same meaning as commonly understood by one of ordinary skill in the art to which the present invention belongs. Terms as defined in a generally used dictionary are not construed ideally or excessively unless defined apparently and specifically.

In this specification, the terms are used only for explaining embodiments while not limiting the present invention. In this specification, the singular forms are intended to include the plural forms as well, unless the context clearly indicates otherwise. The meaning of "comprises" and/or "comprising" used in the specification does not exclude the presence or addition of other components besides a mentioned component.

Hereinafter, preferred embodiments will now be described in detail with reference to the accompanying drawings.

Figure 3:
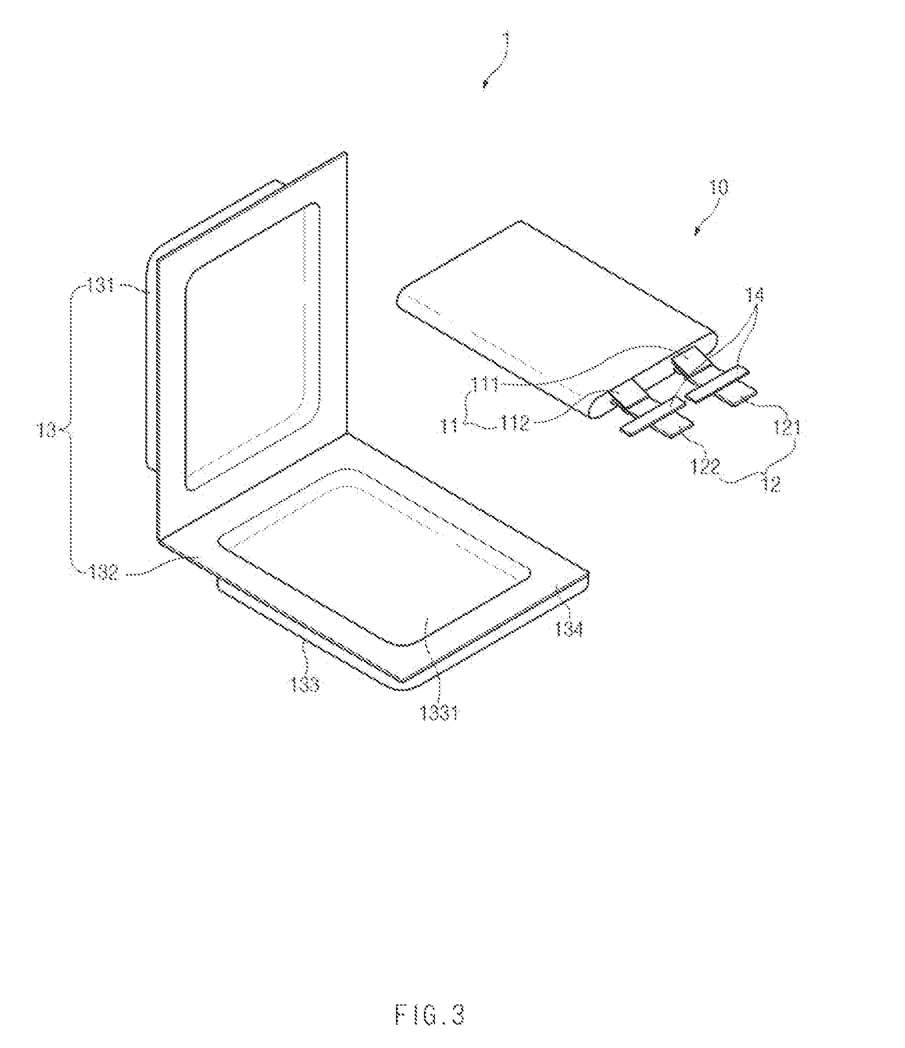
FIG. 3 is an assembly view of a secondary battery according to an embodiment of the present invention.

FIG. 3 is an assembly view of a secondary battery 1 according to an embodiment of the present invention.

A process of manufacturing the pouch-type secondary battery 1 according to an embodiment of the present invention is as follows. First, slurry, in which an electrode active material, a binder, and a plasticizer are mixed, is applied to a positive electrode collector and a negative electrode collector to manufacture a positive electrode and a negative electrode. Then, the positive electrode and the negative electrode are stacked on both sides of a separator to form an electrode assembly 10 having a predetermined shape. Subsequently, the electrode assembly 10 is inserted into a battery case 13, an electrolyte is injected into the battery case 13, and the battery case is sealed.

The electrode assembly 10 includes an electrode tab as illustrated in FIG. 3. The electrode tab 11 is connected to each of the positive electrode and the negative electrode of the electrode assembly 10 and protrudes outward from the electrode assembly 10 to serve as a path through which electrons move between the inside and the outside of the electrode assembly 10. The collector of the electrode assembly 10 is provided as a portion which is coated with the electrode active material and an end portion, that is, a non-coating portion which is not coated with the electrode active material. Here, the electrode tab 11 may be formed by cutting the non-coating portion or formed by connecting a separate conductive member to the non-coating portion through ultrasonic welding or the like. Although the electrode tabs 11 protrude from one side of the electrode assembly 10 in parallel to each other in the same direction as illustrated in FIG. 3, the embodiment is not limited thereto, and thus, the electrode tabs may respectively protrude in different directions.

An electrode lead 12 is connected to the electrode tab 11 of the electrode assembly 10 through laser welding or the like. Also, a portion of the electrode lead 12 is surrounded by an insulation part 14. The insulation part 14 is disposed to be limited within a sealing part 134 on which an upper pouch 131 and a lower pouch 132 of the battery case 13 are thermally bonded to bond the electrode lead 12 to the battery case 13. Also, the insulation part 14 prevents electricity generated from the electrode assembly 10 from flowing to the battery case 13 through the electrode lead 12 and allows the sealing of the battery case 13 to be maintained. Thus, the insulation part 14 is manufactured from a non-conductor having non-conductivity in which the electricity does not flow well. Generally, although relatively thin insulation tape easily attached to the electrode lead 12 is widely used as the insulation part 14, the embodiment is not limited thereto, and thus, various members may be used as long as the members are capable of insulating the electrode lead 12.

The electrode leads 12 may extend in the same direction or may extend in opposite directions, depending on formation positions of a positive tab 111 and a negative tab 112. A positive electrode lead 121 and a negative electrode lead 122 may be made of materials different from each other. That is, the positive electrode lead 121 may be made of the same aluminum (Al) material as a positive electrode plate, and the negative electrode lead 122 may be made of the same copper (Cu) or nickel (Ni)-coated copper material as a negative electrode plate. Also, a portion of the electrode lead 12 protruding outward from the battery case 13 serves as a terminal part and is electrically connected to an external terminal.

In the pouch-type secondary battery 1 according to embodiments of the present invention, the battery case 13 is a pouch manufactured from a flexible material. Hereinafter, the battery case 13 will be described as being the pouch. The battery case 13 is sealed after accommodating the electrode assembly 10 so that a portion of the electrode lead 12, i.e., the terminal part is exposed. The battery case 13 includes the upper pouch 131 and the lower pouch 132 as illustrated in FIG. 3. The lower pouch 132 is provided with an accommodation space 1331 that accommodates the electrode assembly 10, and the upper pouch 131 covers the accommodation space 1331 from an upper side so that the electrode assembly 10 is not separated to the outside of the battery case 13. Here, as illustrated in FIG. 3, the accommodation space 1331 is also provided in the upper pouch 131 to accommodate the electrode assembly 10 from the upper side. Although the upper pouch 131 and the lower pouch 132 may be manufactured so that one side of each of the upper pouch 131 and the lower pouch 132 are connected to each other as illustrated in FIG. 3, the embodiment is not limited thereto, and the pouches may be diversely manufactured, for example, individually manufactured by being separated from each other.

When the electrode lead 12 is connected to the electrode tab 11 of the electrode assembly 10, and the insulation part 14 is provided on the portion of the electrode lead 12, the electrode assembly 10 is accommodated in the accommodation space 1331 provided in the lower pouch 132, and the upper pouch 131 covers the accommodation space 1331 from the upper side. When an electrolyte is injected, and then the sealing part 134 provided on an edge of each of the upper pouch 131 and the lower pouch 132 is sealed, the secondary battery 1 is prepared.

Figure 4:
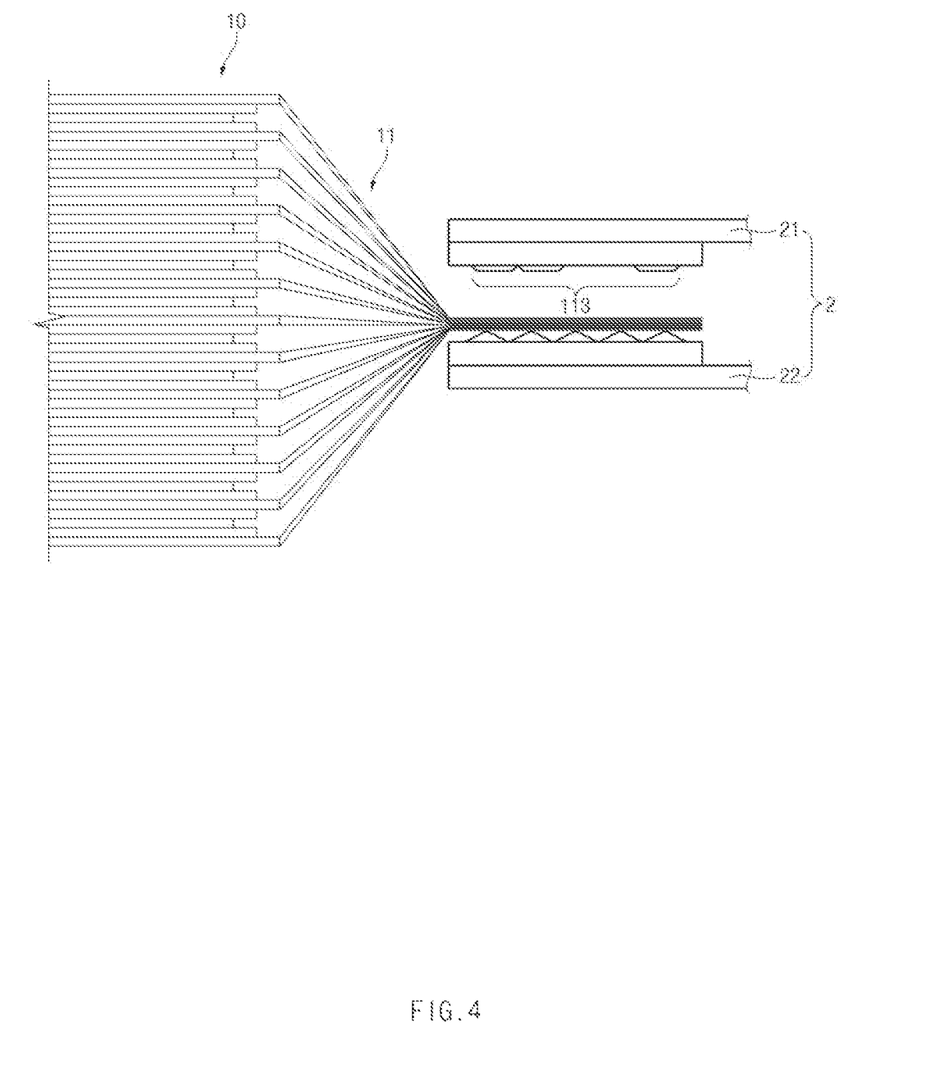
FIG. 4 is a schematic view illustrating a state in which ultrasonic welding is performed on electrode tabs by a welding device according to an embodiment of the present invention.

FIG. 4 is a schematic view illustrating a state in which ultrasonic welding is performed on the electrode tabs 11 by the welding device 2 according to an embodiment of the present invention.

When the plurality of electrode tabs 11 are ultrasonically welded to each other, first of all, the plurality of electrode tabs 11 to be welded are seated on the welding surface of an anvil 22, and then, as illustrated in FIG. 4, a pressure is applied to the electrode tabs 11 on a welding surface 211 (see FIG. 5) of a horn 21. Here, a plurality of protrusions 212 (see FIG. 5) are continuously arranged at a certain interval to provide a protrusion formation part 213 (see FIG. 5) on the welding surface 211 of the horn 21. As the plurality of protrusions 212 are inserted into the plurality of electrode tabs 11, patterns recessed in a shape corresponding to the protrusions 212 are formed on the outermost surface of the electrode tabs 11. Then, when ultrasonic waves having a high frequency of approximate 20 kHz are applied, vibration energy of the horn 21 and the anvil 22 is converted into thermal energy due to friction to perform the welding.

Also, laser welding is performed on an electrode tab 11, which is provided after the ultrasonic welding is completed, and an electrode lead 12. Here, after the electrode tab 11 and the electrode lead 12 overlap each other, laser beams having a high energy density are emitted to the electrode tab 11 and the electrode lead 12. Therefore, portions between the electrode tab 11 and the electrode lead are temporarily melted, and the melted portions are solidified again and then welded.

Figure 5:
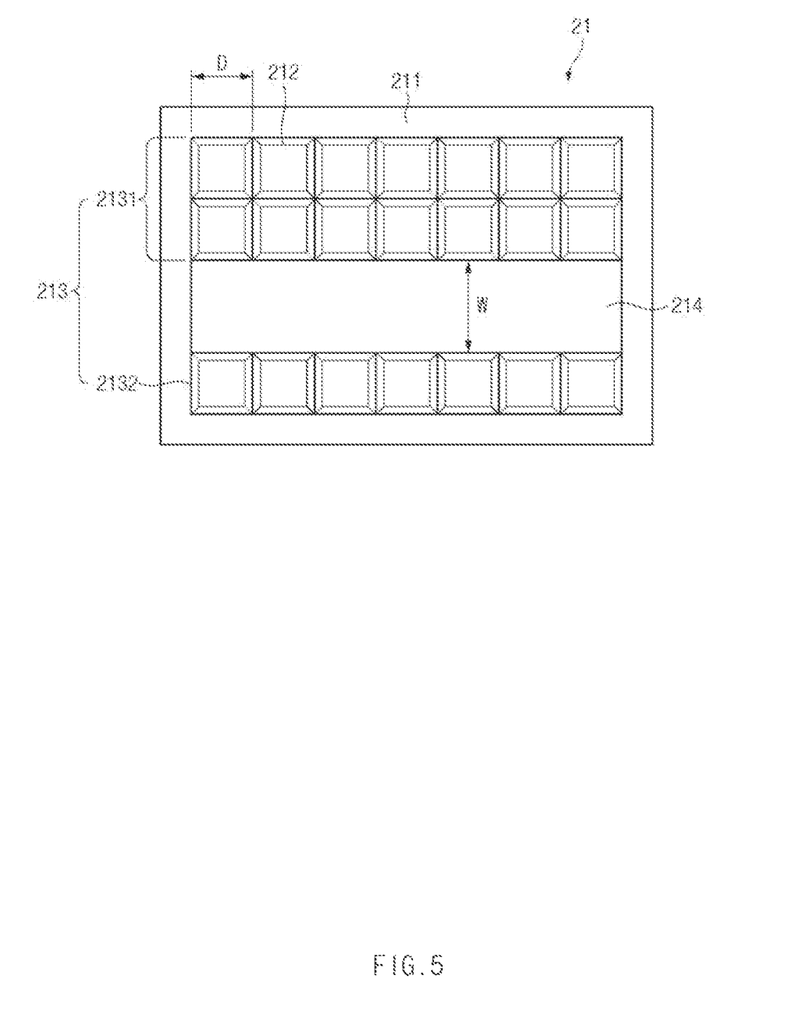
FIG. 5 is a schematic view illustrating a welding surface of a horn according to an embodiment of the present invention.

FIG. 5 is a schematic view illustrating the welding surface 211 of the horn 21 according to an embodiment of the present invention.

When ultrasonic welding is performed by using the welding device 2 according to an embodiment of the present invention, a plurality of pattern formation parts 1131 and 1132 (see FIG. 8) and a pattern-free part 1133 (see FIG. 8) are formed on the electrode tab 11 because a protrusion-free part 214 is provided between the plurality of protrusion formation parts 213 of the horn 21. As the laser welding is performed through the pattern-free part 1133, the energy of the laser beams may be prevented from dispersing to improve the welding strength of the laser welding.

For this, the welding device 2 according to an embodiment of the present invention includes: the horn 21 including the plurality of protrusion formation parts 213, each of which has the plurality of protrusions 212 that protrude from the welding surface 211 and are arranged in a line in at least one row, the plurality of protrusion formation parts 213 respectively forming the pattern formation parts 1131 and 1132 on the electrode tab 11 of the secondary battery 1, and the protrusion-free part 214 which is disposed between the plurality of protrusion formation parts 213 and in which the protrusions 212 are not provided to expose the welding surface 211 to the outside, the protrusion-free part 214 forming the pattern-free part 1133 on the electrode tab 11, wherein the protrusion-free part 214 has a width W greater than a width D of each of the protrusions 212; the anvil 22 facing the horn 21 with the electrode tabs 11 therebetween to weld the electrode tabs 11; and a laser generation part 23 (see FIG. 8) that generates laser beams to emit the laser beams onto the pattern-free part 1133 when the electrode tabs 11 overlaps the electrode lead 12.

Also, the horn 21 according to an embodiment of the present invention includes: the plurality of protrusion formation parts 213, each of which has the plurality of protrusions 212 that protrude from the welding surface 211 and are arranged in a line in at least one row, the plurality of protrusion formation parts 213 respectively forming the pattern formation parts 1131 and 1132 on the electrode tab 11 of the secondary battery 1; and the protrusion-free part 214 which is disposed between the plurality of protrusion formation parts 213 and in which the protrusions 212 are not provided to expose the welding surface 211 to the outside, the protrusion-free part 214 forming the pattern-free part 1133 on the electrode tab 11, wherein the protrusion-free part 214 has the width W greater than the width D of each of the protrusions 212.

As illustrated in FIG. 5, the protrusion formation part 213 is a portion in which the plurality of protrusions 212 protruding from the welding surface 211 of the horn 21 are arranged in a line in at least one row. According to an embodiment of the present invention, the protrusion formation part 213 is provided in plurality and includes a first protrusion formation part 2131 and a second protrusion formation part 2132 as illustrated in FIG. 5.

The first protrusion formation part 2131 is provided on an upper portion of the horn 21 as illustrated in FIG. 5, and the second protrusion formation part 2132 is provided on a lower portion of the horn 21 as illustrated in FIG. 5. Also, when the ultrasonic welding is performed, the upper portion of the horn 21 is located more toward the electrode assembly 10, and the lower portion of the horn 21 is located further away from the electrode assembly 10. However, when the plurality of electrode tabs 11 overlap each other, force by which the electrode tabs 11 are intended to be detached from each other increases closer to the electrode assembly 10. Thus, even in an ultrasonic welding area 113 on which the ultrasonic welding is performed on the electrode tabs 11, welding strength has to increase relatively more in an area that is closer to the electrode assembly 10. For this, according to an embodiment of the present invention, in the first protrusion formation part 2131, the plurality of protrusions 212 may be arranged in lines in a plurality of rows. For example, as illustrated in FIG. 5, in the first protrusion formation part 2131, the plurality of protrusions 212 may be arranged in lines in two rows.

On the other hand, force by which the electrode tabs are intended to be detached from each other decreases further away from the electrode assembly 10. Thus, in the second protrusion formation part 2132, the protrusions may be arranged in a line in only a single row. However, the embodiment is not limited thereto, and thus, in the second protrusion formation part 2132, the plurality of protrusions 212 may also be arranged in lines in a plurality of rows.

The first protrusion formation part 2131 and the second protrusion formation part 2132 are respectively provided on the upper and lower portions as illustrated in FIG. 5. Here, when the pressure is applied to the electrode tab 11 of the secondary battery 1 by the horn 21, the pattern formation parts 1131 and 1132 in which patterns are recessed in a shape corresponding to the protrusion formation parts 213 are provided at a positions corresponding to the protrusion formation parts 213. Thus, in the ultrasonic welding area 113 of the electrode tab 11, the first pattern formation part 1131 in which patterns are recessed in a shape corresponding to the first protrusion formation part 2131 is provided at a position corresponding to the first protrusion formation part 2131. Also, the second pattern formation part 1132 in which patterns are recessed in a shape corresponding to the second protrusion formation part 2132 is provided at a position corresponding to the second protrusion formation part 2132. As a result, the first pattern formation part 1131 and the second pattern formation part 1132 are provided at both ends of the ultrasonic welding region 113, respectively. Therefore, minimal welding strength in the ultrasonic welding area 113 may be ensured.

In the first protrusion formation part 2131 and the second protrusion formation part 2132, the plurality protrusions 212 may be arranged in parallel to each other. Thus, the first pattern formation part 1131 and the second pattern formation part 1132, which are respectively provided by the first protrusion formation part 2131 and the second protrusion formation part 2132, are also parallel to each other.

The protrusion-free part 214 is disposed between the plurality of protrusion formation parts 213 as illustrated in FIG. 5, and the protrusions 212 are not provided to expose the welding surface 211 to the outside. When the pressure is applied to the electrode tab 11 of the secondary battery 1 by the horn 21, the pattern-free part 1133 is formed on the electrode tab 11. Also, subsequently, the laser welding is performed after the electrode tab 11 and the electrode lead 12 overlap each other. Here, according to an embodiment of the present invention, the laser welding is performed on the electrode tab 11 through the pattern-free part 1133. Accordingly, the energy of the laser beams may be prevented from dispersing to improve the welding strength of laser welding.

When the laser welding is performed, the pattern-free part 1133 has to have a larger width to a certain extent in order to allow the laser beams to avoid an interference with the patterns. However, when the pattern-free part 133 has an excessively large width, the welding strength may be reduced. Thus, the width W of the protrusion-free part 214 of the horn 21 for providing the pattern-free part 1133 is greater than the width D of the protrusion 212 and less than two times the width D of the protrusion 212. For example, when the width D of the protrusion 212 is 1.2 mm, the width W of the protrusion-free part 214 may be greater than 1.2 mm and less than 2.4 mm, preferably, 1.8 mm to 2.2 mm. Accordingly, while the laser beams avoid the interference with the patterns, the welding strength may be ensured at the same time.

Figure 6:
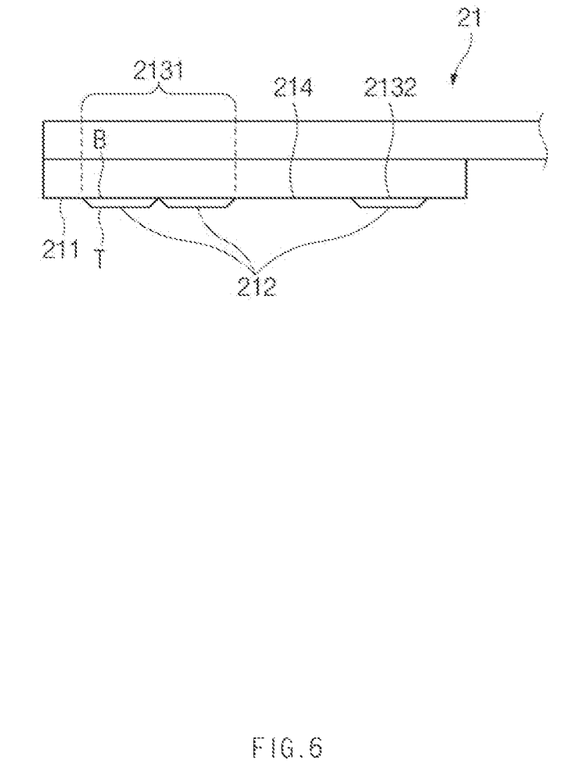
FIG. 6 is a side view of a horn according to an embodiment of the present invention.

FIG. 6 is a side view of the horn 21 according to an embodiment of the present invention.

According to an embodiment of the present invention, as illustrated in FIG. 6, each of the protrusions 212 is provided to protrude from the welding surface 211 to one side in a protrusion formation part 213 of the horn 21. As a shape of the protrusions 212 is sharper, the protrusion is more deeply inserted into the electrode tab 11. As a result, thermal energy may be concentrated on a tip of the protrusion 212 to improve the welding strength. Accordingly, according to the related art, the protrusion 212 has a cone or polygonal pyramid shape, but this shape may damage the electrode tab 11.

However, according to an embodiment of the present invention, after the ultrasonic welding is performed between the plurality of electrode tabs 11, the laser welding is performed between the electrode tabs 11 and the electrode lead 12. Here, the welding strength between the plurality of electrode tabs 11 may be significantly improved. Thus, according to an embodiment of the present invention, the protrusion 212 has a truncated cone or a truncated polygonal pyramid shape in which a top surface T and a bottom surface B are parallel to each other as illustrated in FIG. 6, and thus the damage of the electrode tab 11 may be reduced because the protrusion 212 is not sharp.

Figure 7:
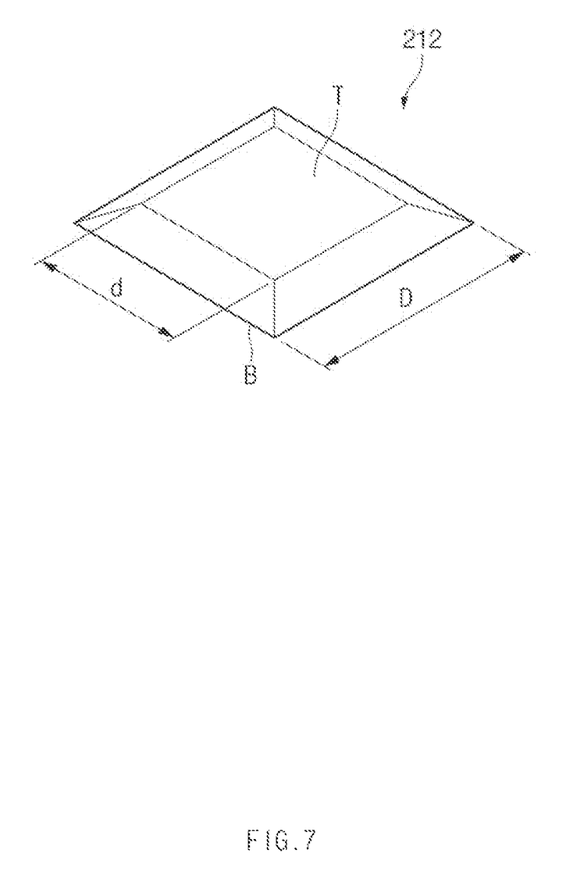
FIG. 7 is a perspective view of a protrusion according to an embodiment of the present invention.

FIG. 7 is a perspective view of the protrusion 212 according to an embodiment of the present invention.

Since the protrusion 212 has a truncated cone or a truncated polygonal pyramid shape, the protrusion 212 has a top surface T and a bottom surface B, and the top surface T and the bottom surface B are parallel to each other. In order to ensure minimal welding strength in ultrasonic welding as the protrusion 212 is inserted into the electrode tab 11, a surface area of the top surface T of the protrusion 212 has to be narrowed to a certain extent. Simultaneously, in order to reduce the damage of the electrode tab 11 as much as possible, a surface area of the top surface T of the protrusion 212 has to be widened to a certain extent.

Thus, if the protrusion 212 has a truncated square pyramid shape as illustrated in FIG. 7, it is preferable that a length of a side d of the top surface T is half or more that of a side D of the bottom surface B. Particularly, it is more preferable that the length of the side d of the top surface T is ⅔ or more that of the side D of the bottom surface B. For example, when the length of the side D of the bottom surface B of the protrusion 212 is 1.2 mm, the length of the side d of the top surface T may be 0.5 mm or more, more preferably, 0.8 mm or more. Consequently, the damage of the electrode tab 11 may be reduced as much as possible. However, it is preferable that the length of the side d of the top surface T is ¾ or less that of the side D of the bottom surface B. Consequently, the minimal welding strength may be ensured.

As described above, on the welding surface 211 of the horn 21, the width W of the protrusion-free part 214 is greater than the width D of the protrusion 212. When the protrusion 212 has the truncated square pyramid shape, the width D of the protrusion 212 is equal to the length of the side D of the bottom surface B. Thus, the width W of the protrusion-free part 214 is greater than the length of the side D of the bottom surface B of the protrusion 212. However, the embodiment is not limited thereto, and thus, the width W of the protrusion-free part 214 may be greater than a diameter of the bottom surface B of the protrusion 212 because the width D of the protrusion 212 is the diameter of the bottom surface B when the protrusion 212 has the truncated cone shape.

Also, when the protrusion 312 has a polygonal pyramid shape, particularly, a regular polygonal pyramid according to the related art, a specific angle is formed between each of sides on a bottom surface thereof and each of sides on a welding surface as illustrated in FIG. 1, and thus regular arrangement with diamond patterns are established. However, according to an embodiment of the present invention, the protrusion-free part 214 is provided between the first protrusion formation part 2131 and the second protrusion formation part 2132. Also, the protrusion-free part 214 has to have a larger width to a certain extent. Thus, if the protrusion 212 has the truncated square pyramid shape as illustrated in FIG. 7, the side D of the bottom surface B of the protrusion 212 is disposed in parallel to the side of the welding surface 211 as illustrated in FIG. 5. That is, the protrusions 212 may be regularly arranged in in the form of a checkerboard. Accordingly, the larger width W of the protrusion-free part 214 may be ensured, in the limited ultrasonic welding region 113, to thereby improve space efficiency, when compared to the arrangement with diamond patterns.

Figure 8:
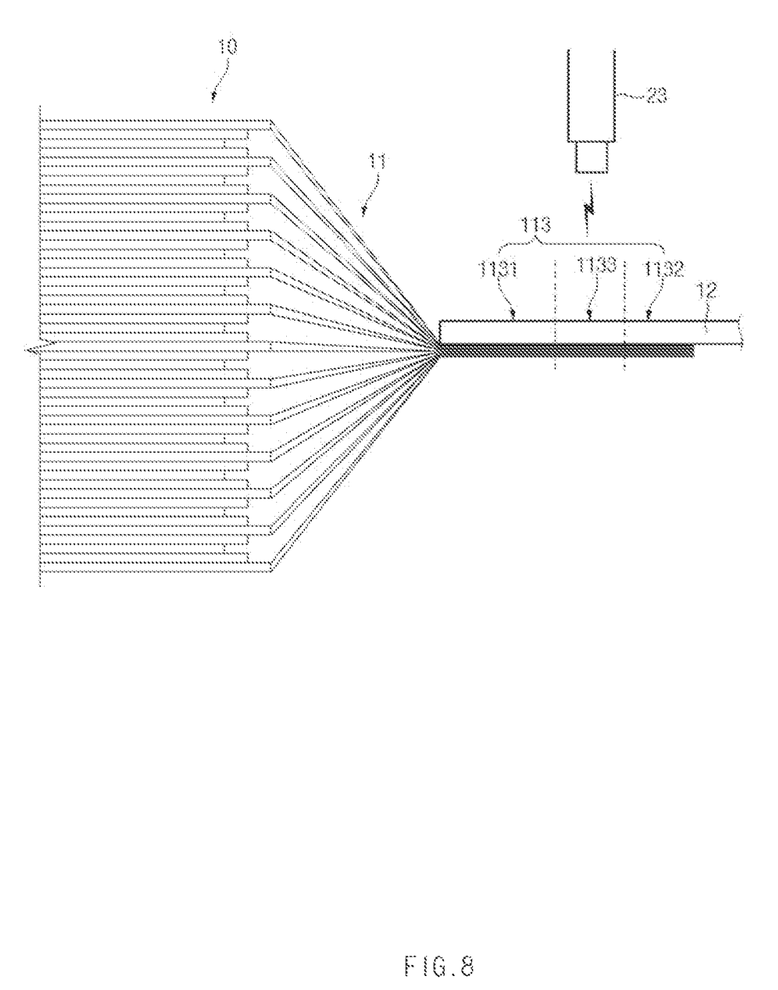
FIG. 8 is a schematic view illustrating a state in which laser welding is performed on the electrode tabs and an electrode lead by the welding device according to an embodiment of the present invention.

FIG. 8 is a schematic view illustrating a state in which the laser welding is performed on the electrode tab 11 and the electrode lead 12 by the welding device 2 according to an embodiment of the present invention.

When the ultrasonic welding for the plurality of electrode tabs 11 are completed by using the horn 21 and anvil 22, the laser welding is performed by using the laser generation part 23 as illustrated in FIG. 8.

When the electrode lead 12 overlaps the ultrasonically welded electrode tabs 11, the laser generation part 23 generates the laser beams to emit the laser beams onto a portion on which the electrode tabs 11 and the electrode lead 12 overlap each other. Particularly, according to an embodiment of the present invention, the laser generation part 23 emits the laser beams onto the pattern-free part 1133 as illustrated in FIG. 8. Accordingly, the energy of the laser beams may be prevented from dispersing to improve the welding strength of the laser welding.

Figure 9:
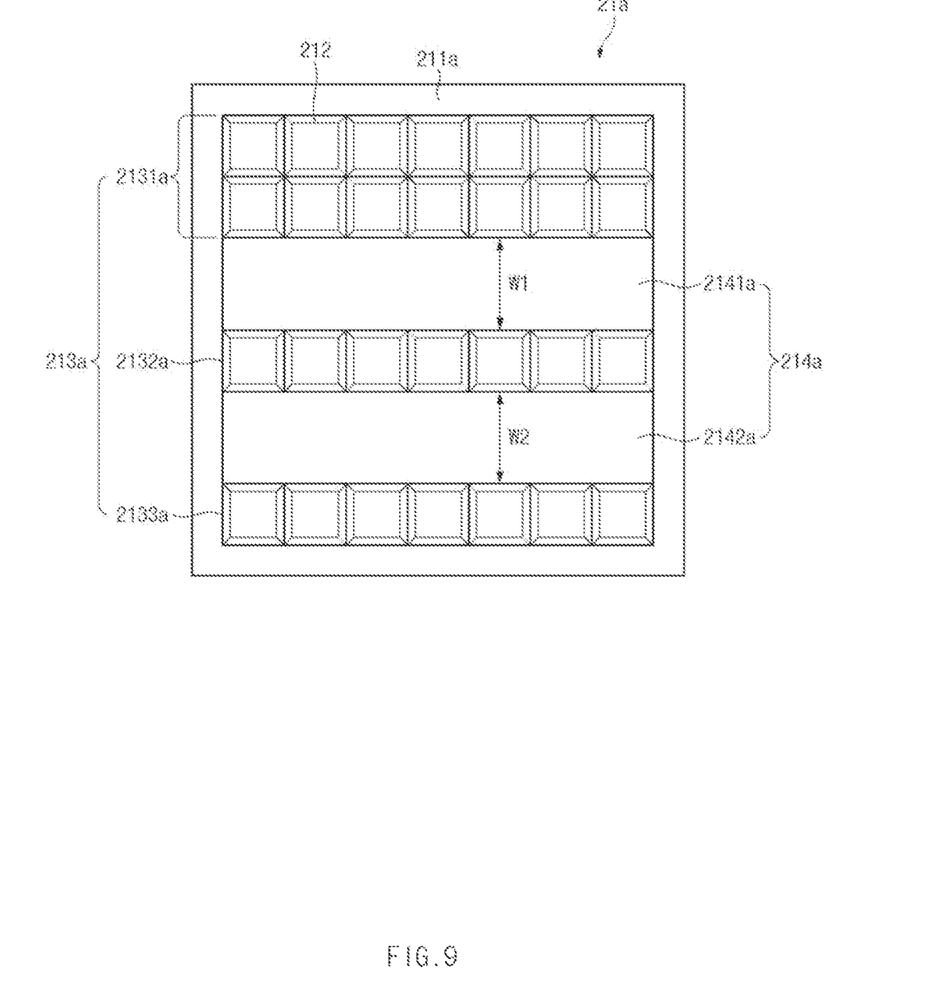
FIG. 9 is a schematic view illustrating a welding surface of a horn according to another embodiment of the present invention.

FIG. 9 is a schematic view illustrating a welding surface 211*a* of a horn 21*a* according to another embodiment of the present invention.

According to an embodiment of the present invention, the protrusion formation part 213 includes the first protrusion formation part 2131 and the second protrusion formation part 2132, and the protrusion-free part 214 is provided between the first protrusion formation part 2131 and the second protrusion formation part 2132. If the secondary battery 1 increases in size, a surface area of the electrode tab 11 may be widened. In this case, it is preferable that a surface area of the ultrasonic welding area 113 is also widened to a certain extent. However, if only one protrusion-free part 214 is provided, the surface area of the ultrasonic welding area 113 may not be widened, or only the protrusion formation part 213 may be excessively widened so as to increase in surface area of the ultrasonic welding area 113.

Thus, according to another embodiment of the present invention, a protrusion formation part 213*a* has three or more protrusion formation parts, and a protrusion-free part 214*a* has two or more protrusion-free parts. For example, the protrusion formation part 213*a* may further include a third protrusion formation part 2133*a* as illustrated in FIG. 9. According to another embodiment of the present invention, since the protrusion formation part 213*a* has the three or more protrusion formation parts, the number of pattern formation parts (not shown) may correspond to that of protrusion formation parts.

In the third protrusion formation part 2133*a*, the plurality of protrusions 212 are also arranged in a line in at least one row. Also, as illustrated in FIG. 9, a first protrusion formation part 2131a may be provided on an upper portion of a horn 21a, a second protrusion formation part 2132a may be provided on a central portion of the horn 21a, and the third protrusion formation part 2133a may be a lower portion of the horn 21a. Thus, in an ultrasonic welding area 113, the third pattern formation part (not shown) in which patterns are recessed in a shape corresponding to the third protrusion formation part 2133a may be further provided at a position corresponding to the third protrusion formation part 2133a.

As described above, in the first protrusion formation part 2131a, the plurality of protrusions 212 may be arranged parallel to the second protrusion formation part 2132a. Also, as illustrated in FIG. 9, in the third protrusion formation part 2133a, the plurality of protrusions 212 may also be arranged parallel to the second protrusion formation part 2132a. Thus, the first to third pattern formation parts (not shown) may be provided parallel to each other.

The protrusion-free part 214a may be disposed between the plurality of the protrusion formation parts 213a. Thus, as illustrated in FIG. 9, the protrusion-free part 214a may include a first protrusion-free part 2141a provided between the first protrusion formation part 2131a and the second protrusion formation part 2132a, and a second protrusion-free part 2142a provided between the second protrusion formation part 2132a and the third protrusion formation part 2133a. Thus, when a pressure is applied to the electrode tab 11 of the secondary battery 1 by the horn 21a, a first pattern-free part (not shown) is formed on the electrode tab 11 by the first protrusion-free part 2141a, and a second pattern-free part (not shown) is formed on the electrode tab 11 by the second protrusion-free part 2142a. In addition, when laser welding is performed subsequently after the electrode tab 11 and the electrode lead 12 overlap each other, the laser welding is performed on the electrode tab 11 through the first pattern-free part (not shown) and the second pattern-free part (not shown). Consequently, since the surface area on which the laser welding is performed increases, the welding strength of the laser welding may be further improved.

Also, each of both a width W1 of the first protrusion-free part 2141a and a width W2 of the second protrusion-free part 2142a may be greater than the width D of the protrusion 212 and less than two times the width D of the protrusion 212. Accordingly, while the laser beams avoid the interference with the patterns, the welding strength may be ensured at the same time.

Those with ordinary skill in the technical field to which the present invention pertains will understand that the present invention may be carried out in other specific forms without changing the technical idea or essential features. Thus, the above-described embodiments are to be considered illustrative and not restrictive to all aspects. The scope of the present invention is defined by the appended claims rather than the foregoing description and the exemplary embodiments described therein. Various modifications made within the meaning and scope of claims and equivalent concepts of the claims are included in the scope of the present invention.

The invention claimed is:

1. A horn comprising:
a plurality of protrusion formation parts, each of which has a plurality of protrusions that protrude from a welding surface and are arranged in a line in at least one row, the plurality of protrusion formation parts respectively configured to form pattern formation parts on an outermost electrode tab of electrode tabs of a secondary battery; and
a protrusion-free part which is disposed between two protrusion formation parts of the plurality of protrusion formation parts and in which protrusions are not provided to expose the welding surface to an outside, the protrusion-free part configured to form a pattern-free part on the outermost electrode tab,
wherein the protrusion-free part has a width greater than a width of each of the protrusions.

2. The horn of claim 1, wherein the width of the protrusion-free part is less than two times the width of each of the protrusions.

3. The horn of claim 1, wherein the plurality of protrusion formation parts comprises a first protrusion formation part and a second protrusion formation part, and
in the first protrusion formation part, the plurality of protrusions are arranged in lines in a plurality of rows.

4. The horn of claim 3, wherein, in the second protrusion formation part, the plurality of protrusions are arranged parallel to the plurality of protrusions of the first protrusion formation part.

5. The horn of claim 4, wherein the plurality of protrusion formation parts further comprises a third protrusion formation part in which the plurality of protrusions are arranged parallel to the plurality of protrusions of the second protrusion formation part.

6. The horn of claim 5, wherein the protrusion-free part comprises:
a first protrusion-free part disposed between the first protrusion formation part and the second protrusion formation part; and
a second protrusion-free part disposed between the second protrusion formation part and the third protrusion formation part.

7. The horn of claim 1, wherein each of the protrusions has a shape of a truncated square pyramid.

8. The horn of claim 7, wherein a side of a bottom surface of each of the protrusions is parallel to a side of the welding surface.

9. The horn of claim 7, wherein in each of the plurality of protrusions, a length of a side of a top surface of the protrusion is half or more than a length of a side of a bottom surface of the protrusion.

10. The horn of claim 9, wherein in each of the plurality of protrusions, the length of the side of the top surface of the protrusion is $2/3$ or more than the length of the side of the bottom surface of the protrusion.

11. A welding device comprising:
a horn comprising a plurality of protrusion formation parts, each of which has a plurality of protrusions that protrude from a welding surface and are arranged in a line in at least one row, the plurality of protrusion formation parts respectively configured to form pattern formation parts on an outermost electrode tab of electrode tabs of a secondary battery, and a protrusion-free part which is disposed between two protrusion formation parts of the plurality of protrusion formation parts and in which protrusions are not provided to expose the welding surface to an outside, the protrusion-free part configured to form a pattern-free part on the outermost electrode tab, wherein the protrusion-free part has a width greater than a width of each of the protrusions;
an anvil facing the horn when the electrode tabs are disposed therebetween to weld the electrode tabs; and
a laser generation part configured to generate laser beams to emit the laser beams onto the pattern-free part when the outermost electrode tab overlaps an electrode lead.

12. The welding device of claim 11, wherein the plurality of protrusion formation parts comprises a first protrusion formation part and a second protrusion formation part,
- in the first protrusion formation part, the plurality of protrusions are arranged in lines in a plurality of rows, and
- in the second protrusion formation part, the plurality of protrusions are arranged parallel to the plurality of protrusions of the first protrusion formation part.

13. The welding device of claim 12, wherein the plurality of protrusion formation parts further comprises a third protrusion formation part in which the plurality of protrusions are arranged parallel to the plurality of protrusions of the second protrusion formation part.

14. The welding device of claim 13, wherein the protrusion-free part comprises:
- a first protrusion-free part disposed between the first protrusion formation part and the second protrusion formation part; and
- a second protrusion-free part disposed between the second protrusion formation part and the third protrusion formation part.

15. The horn of claim 1, wherein the plurality of protrusion formation parts respectively configured to form pattern formation parts recessed in an outermost electrode tab of electrode tabs of a secondary battery.

* * * * *

UNITED STATES PATENT AND TRADEMARK OFFICE
CERTIFICATE OF CORRECTION

| | | |
|---|---|---|
| PATENT NO. | : 12,257,646 B2 | Page 1 of 1 |
| APPLICATION NO. | : 17/423293 | |
| DATED | : March 25, 2025 | |
| INVENTOR(S) | : Jung Su Park, Chang Bum Ahn and Il Hwan Park | |

It is certified that error appears in the above-identified patent and that said Letters Patent is hereby corrected as shown below:

On the Title Page

Item (72), please correct residence of Inventor Il Hwan Park as follows:
-- Il Hwan Park, Daejeon (KR) --

Signed and Sealed this
Twenty-second Day of July, 2025

Coke Morgan Stewart
*Acting Director of the United States Patent and Trademark Office*